United States Patent [19]
Welsh

[11] Patent Number: 5,600,687
[45] Date of Patent: Feb. 4, 1997

[54] STEAM DAM SLIDE WITH CABLE MANIPULATOR FOR RADIALLY POSITIONING HOISTED LOAD IN ANNULUS

[75] Inventor: Christopher M. Welsh, San Jose, Calif.

[73] Assignee: General Electric Company, San Jose, Calif.

[21] Appl. No.: 532,185

[22] Filed: Sep. 22, 1995

[51] Int. Cl.⁶ .................................................. G21C 19/00
[52] U.S. Cl. ....................... 376/260; 254/93 R; 254/389; 193/42
[58] Field of Search ..................................... 376/260, 463; 254/93 R, 389; 269/1, 289 MR; 193/42, 35 R; 414/146; 242/615, 615.4

[56] References Cited

U.S. PATENT DOCUMENTS 4,436,692  3/1984  Stenabaugh ........................... 376/260

Primary Examiner—Daniel D. Wasil
Attorney, Agent, or Firm—James E. McGinness

[57] ABSTRACT

A tool for radially positioning a hoisted load suspended from the refueling bridge by a cable and facilitating lowering of the hoisted load into the downcomer annulus of a boiling water reactor. During repair of the shroud, hardware must be lowered into the annulus for installation. The hardware installation in turn requires the lowering of tooling into the annulus and its subsequent removal via cables. The feedwater sparger and core spray piping are located above and partially obstruct the vertical access to the annulus. To protect the feedwater sparger and core spray piping against damage during the lowering of various hardware and tooling into the annulus, a cover is installed over the feedwater sparger and core spray piping at the azimuthal location of the hoist. This cover further limits the vertical access to the annulus. A steam dam slide with a cable manipulator is seated on the shroud flange at the azimuthal location of the repair procedure. The steam dam slide protects the steam dam against damage from the hoisted load being lowered thereon and guides that hoisted load into the annulus. When the hoisted load clears the elevation of the cable manipulator, a roller of the cable manipulator is extended to push the cable and its hoisted load radially outward to a desired position in the annulus.

13 Claims, 6 Drawing Sheets

STEAM DAM SLIDE WITH CABLE MANIPULATOR FOR RADIALLY POSITIONING HOISTED LOAD IN ANNULUS

FIELD OF THE INVENTION

This invention relates to tooling which is useful in installing hardware in a nuclear reactor. In particular, the invention relates to tooling for installing hardware for stabilizing the core shroud of a nuclear reactor to resist deflection in response to a seismic event and/or loss-of-coolant accident (LOCA).

BACKGROUND OF THE INVENTION

A conventional boiling water reactor is shown in FIG. 1. Feedwater is admitted into a reactor pressure vessel (RPV) 10 via a feedwater inlet 12 and a feedwater sparger 14, which is a ring-shaped pipe having suitable apertures for circumferentially distributing the feedwater inside the RPV. The feedwater from sparger 14 flows downwardly through the downcomer annulus 16, which is an annular region between RPV 10 and core shroud 18. In addition, a core spray inlet 11 supplies water to a core spray sparger 13 via core spray piping 15.

Core shroud 18 is a stainless steel cylinder surrounding the nuclear fuel core 20. Core 20 is made up of a plurality of fuel bundle assemblies 22 (only two 2×2 arrays of which are shown in FIG. 1). Each array of fuel bundle assemblies is supported at the top by a top guide 19 and at the bottom by a core plate 21. The core top guide provides lateral support for the top of the fuel assemblies and maintains the correct fuel channel spacing to permit control rod insertion.

The water flows through downcomer annulus 16 to the core lower plenum 24. The water subsequently enters the fuel assemblies 22, wherein a boiling boundary layer is established. A mixture of water and steam enters core upper plenum 26 under shroud head 28. Vertical standpipes 30 atop shroud head 28 are in fluid communication with core upper plenum 26. The steam-water mixture flows through standpipes 30 and enters steam separators 32, which are of the axial-flow centrifugal type. The separated liquid water then mixes with feedwater in the mixing plenum 33, which mixture then returns to the core via the downcomer annulus. The steam passes through steam dryers 34 and enters steam dome 36. The steam is conducted from the RPV via steam outlet 38.

The BWR also includes a coolant recirculation system which provides the forced convection flow through the core necessary to attain the required power density. A portion of the water is sucked from the lower end of the downcomer annulus 16 via recirculation water outlet 42 and forced by a centrifugal recirculation pump (not shown) into jet pump assemblies 44 (only one of which is shown) via recirculation water inlets 46. The BWR has two recirculation pumps, each of which provides the driving flow for a plurality of jet pump assemblies. The jet pump assemblies are circumferentially distributed around the core shroud 18.

The core shroud 18 (see FIG. 2) comprises a shroud flange 18a for supporting the shroud head 28; a circular cylindrical upper shroud wall 18b having a top end welded to shroud flange 18a; an annular top guide support ring 18c welded to the bottom end of upper shroud wall 18b; a circular cylindrical middle shroud wall comprising three sections 18d, 18e and 18f welded in series, with a top end of section 18d being welded to top guide support ring 18c; and an annular core plate support ring 18g welded to the bottom end of middle shroud wall section 18f and to the top end of a lower shroud wall 18h. The entire shroud is supported by a shroud support 50, which is welded to the bottom of lower shroud wall 18h, and by annular shroud support plate 52, which is welded at its inner diameter to shroud support 50 and at its outer diameter to RPV 10.

In the event of a seismic disturbance, it is conceivable that the ground motion will be translated into lateral deflection relative to the reactor pressure vessel of those portions of the shroud located at elevations above shroud support plate 52. Such deflections would normally be limited by acceptably low stresses on the shroud and its weldments. However, if the shroud weld zones have failed due to stress corrosion cracking, there is the risk of misalignment and damage to the core and the control rod components, which would adversely affect control rod insertion and safe shutdown.

Stress corrosion cracking in the heat affected zone of any shroud girth seam welds diminishes the structural integrity of shroud 18, which vertically and horizontally supports core top guide 19 and shroud head 28. In particular, a cracked shroud increases the risks posed by a loss-of-coolant accident (LOCA). During a LOCA, the loss of coolant from the reactor pressure vessel produces a loss of pressure above the shroud head 28 and an increase in pressure inside the shroud, i.e., underneath the shroud head. The result is an increased lifting force on the shroud head and on the upper portions of the shroud to which the shroud head is bolted. If the core shroud has fully cracked girth welds, the lifting forces produced during a LOCA could cause the shroud to separate along the areas of cracking, producing undesirable leaking of reactor coolant.

A known repair method for vertically restraining a weakened core shroud utilizes tensioned tie rods coupled to the shroud flange and to the shroud support plate. In addition, the shroud is restrained laterally by installation of wishbone springs which, along with the tie rod, are components of the shroud repair assembly. During repair of the shroud, the respective components of the repair assembly must be lowered into the annulus for installation in sequence. This installation of hardware in turn requires various tooling to be lowered into the annulus and later removed via cables. The feedwater sparger 14 and core spray piping 15 (best seen in FIG. 3) are located above and partially obstruct the vertical access to the annulus 16. To protect the feedwater sparger and core spray piping against damage during the lowering of various hardware and tooling into the annulus, a cover is installed over the feedwater sparger and core spray piping at the azimuthal location of the hoist. This cover further limits the vertical access to the annulus. If left unprotected, the steam dam 29 could be damaged by hardware and tooling as attempts are made to enter the annulus while avoiding the feedwater sparger and core spray piping. Thus, there is a need for a tool which will protect the steam dam against damage, which will guide lowered hardware or tooling into the annulus, and which can manipulate the hoisting cable to move the hardware or tooling suspended at the end of the cable in a radially outward direction to a desired position in the annulus.

SUMMARY OF THE INVENTION

The present invention is a tool comprising a steam dam slide for protecting the steam dam against damage while guiding the cable hoisted load into the annulus and a cable manipulator capable of radially positioning the hoisted load by pushing the cable radially outward. In accordance with the preferred embodiment, the steam dam slide and cable manipulator are combined in a tool assembly which is seated on the shroud flange at the azimuthal location of the hoist.

The steam dam slide comprises an inclined surface which overhangs the shroud flange at an azimuthal position directly underneath where a hoisted load is to be low-ered by cable. The support frame for the inclined surface of the steam dam slide has a pair of seating recesses which form-fit around the steam dam and shroud flange. The steam dam slide is clamped in place by a pair of air-actuated or hydraulic clamping cylinders having pistons with grippers which press against the inner circumference of the shroud flange.

The cable manipulator comprises a roller mounted on a shaft. The bearings at the opposing ends of the shaft are mounted on the distal ends of the pistons of respective air-actuated or hydraulic positioning cylinders which are mounted in parallel on opposing sides of the support frame for the steam dam slide. When the lowered hoisted load clears the elevation of the roller, the pistons of the positioning cylinders are extended in tandem with equal strokes, causing the roller to translate in a generally radially outward direction. The translated roller pushes the cable radially outward until the hoisted load hangs at a desired radial position in the annulus. As the hoisted load is lowered further under the influence of gravity by unwinding the cable, the roller rotates and abuts the traveling cable, thereby maintaining the desired radial position of the traveling cable and the load suspended thereon.

DETAILED DESCRIPTION OF THE PREFERRED EMBODIMENTS

Figure 1:
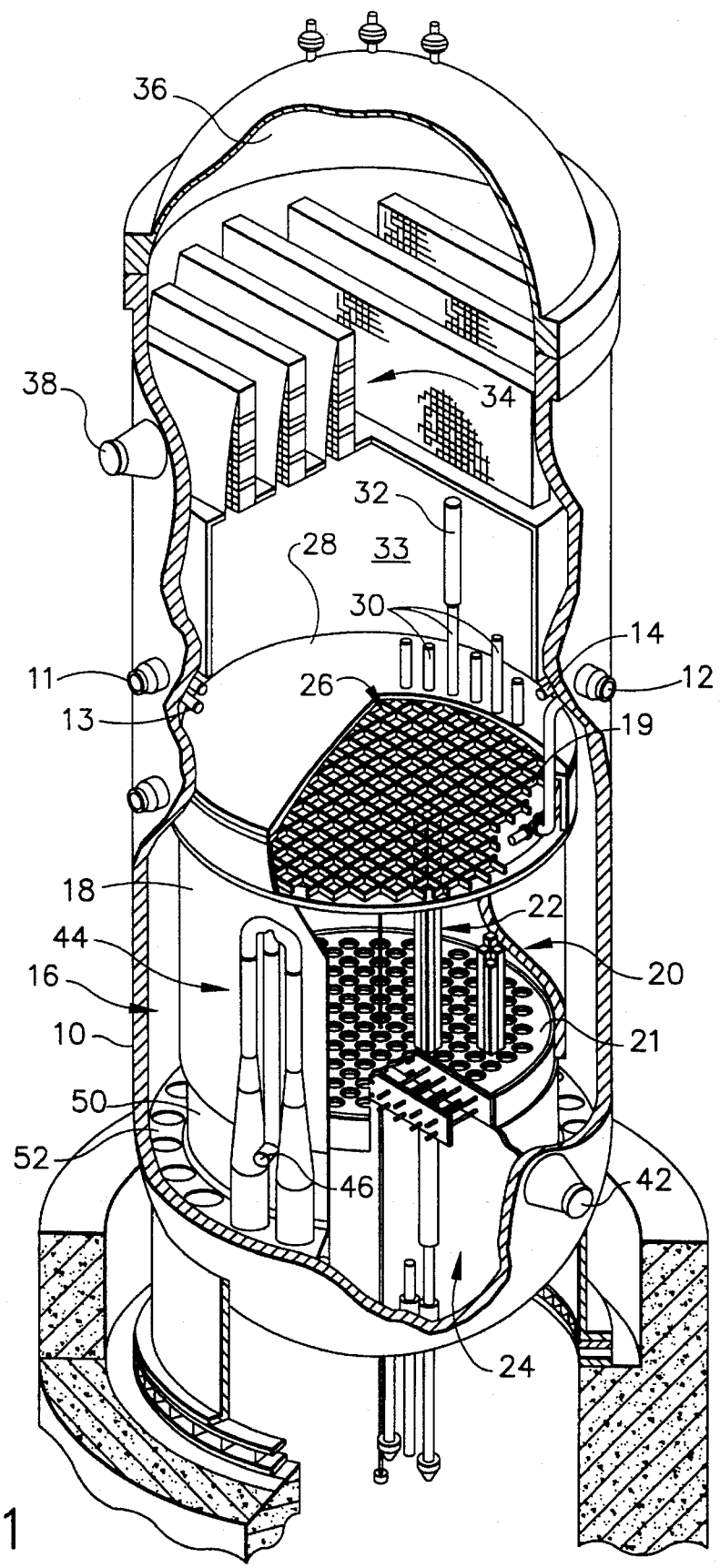
FIG. 1 is a schematic showing a partially cutaway isometric view of a conventional BWR.
Figure 2:
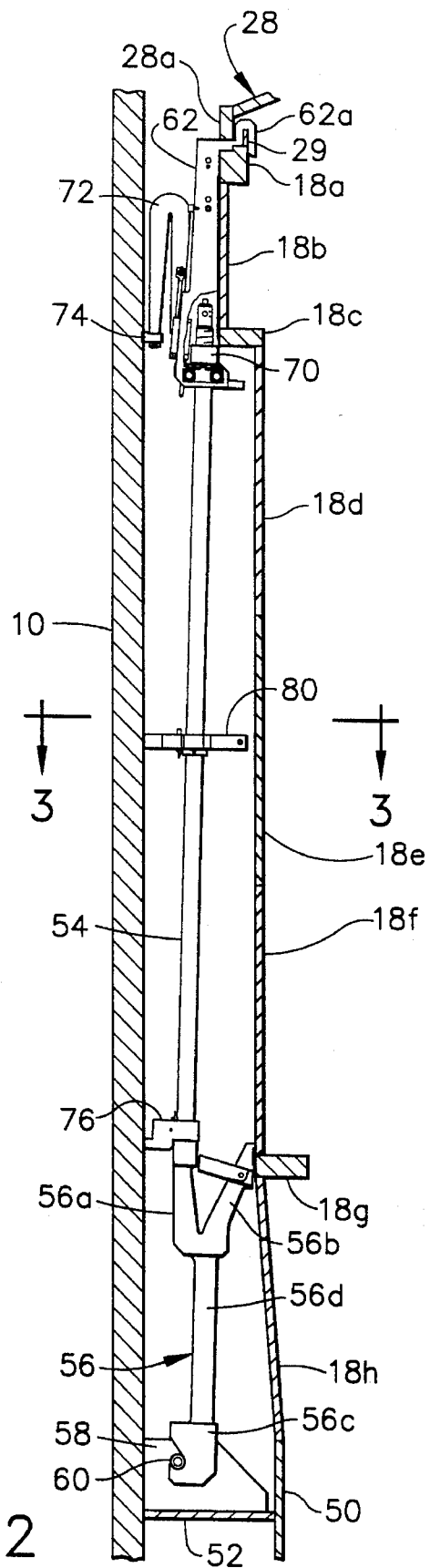
FIG. 2 is an elevational view of core shroud repair hardware comprising a tie rod assembly for vertically restraining the shroud and wishbone springs for laterally restraining the shroud at the elevations of the top guide support ring and the core plate.

Referring to FIG. 2, a shroud restraint tie rod assembly comprises a tie rod 54 having a circular cross section. A lower end of tie rod 54 is anchored in a threaded bore formed in the end of a spring arm 56a of a lower spring 56. Tie rod 54 extends from the end of spring arm 56a to a position adjacent the outer circumferential surface of the top guide support ring 18c. The upper end of tie rod 54 has a threaded portion.

The lower spring 56 is anchored to a gusset plate 58 attached to the shroud support plate 52. The lower spring 56 has a slotted end which straddles gusset plate 58 and forms a clevis hook 56c. The clevis hooks under opposite ends of a clevis pin 60 inserted through a hole machined in the gusset plate 58. Engagement of the slotted end with the gusset plate 58 maintains alignment of lower spring 56 under the action of seismic motion of the shroud, which may be oblique to the spring's radial orientation.

The tie rod 54 is supported at its top end by an upper support assembly which hangs on the shroud flange. A pair of notches or slots are machined in the shroud head ring 28a of shroud head 28. The notches are positioned in alignment with a pair of bolted upper support plate segments 62 of the upper support assembly when the shroud head 28 is properly seated on the top surface of shroud flange 18a. These notches facilitate the coupling of the tie rod assembly to the shroud flange.

The pair of notches at each tie rod azimuthal position receive respective hook portions 62a of the upper support plates 62. Each hook 62a conforms to the shape of the top surface of shroud flange 18a and the shape of the steam dam 29. The distal end of hook 62a hooks on the inner circumference of shroud dam 29.

The upper support plates 62 are connected in parallel by a top support bracket (not shown) and a support block 66 which forms the anchor point for the top of the tie rod. Support block 66 has an unthreaded bore, tapered at both ends, which receives the upper end of tie rod 54. After the upper end of tie rod 54 is passed through the bore, a threaded tensioning nut 70 is screwed onto the threaded portion of tie rod 54.

The assembly comprised of support plates 62 with hooks 62a, support block 66, tie rod 54, lower spring 56, clevis pin 60 and gusset plate 58 form a vertical load path by which the shroud flange 18a is connected to the shroud support plate 52. In the tensioned state, upper support plates 62 exert a restraining force on the top surface of the shroud flange 18a which opposes separation of the shroud at any assumed failed circumferential weld location.

Lateral restraint at the elevation of the top guide support ring 18c is provided by an upper spring 72 having a double cantilever "wishbone" design. The end of the radially outer spring arm has an upper contact spacer 74 rotatably mounted thereon which bears against the inner surface of the RPV wall 10.

Referring back to FIG. 2, the spring arm 56a of lower spring 56 laterally supports the shroud 18 at the core plate 18e, against the vessel 10, via a lower contact spacer 76. The top end of spring arm 56a has a threaded bore to provide the attachment for the bottom of the tie rod 54. The member 56d connecting the upper wishbone spring 56a, 56b to the clevis hook 56c is offset from the line of action between the lower end of tie rod 54 and the clevis pin 60 to provide a vertical spring compliance in the load path to the tie rod.

A middle support 80 is preloaded against the vessel wall at assembly by radial interference which bends the tie rod 54, thereby providing improved resistance to vibratory excitation failure of the tie rod.

The installation of the shroud repair hardware shown in FIG. 2 involves a sequence of steps which are all performed by remote manipulation of assembly components and tooling. The hardware and tooling must be lowered into the downcomer annulus by means of a cable suspended from a hoist on the refueling bridge. The shroud repair shown in FIG. 2 requires the insertion of a clevis pin in a hole machined in the gusset plate 58. The hole in gusset plate 58 is preferably formed by electrodischarge machining (EDM). This is accomplished by lowering an EDM actuator into the annulus using a cable.

Figure 3:
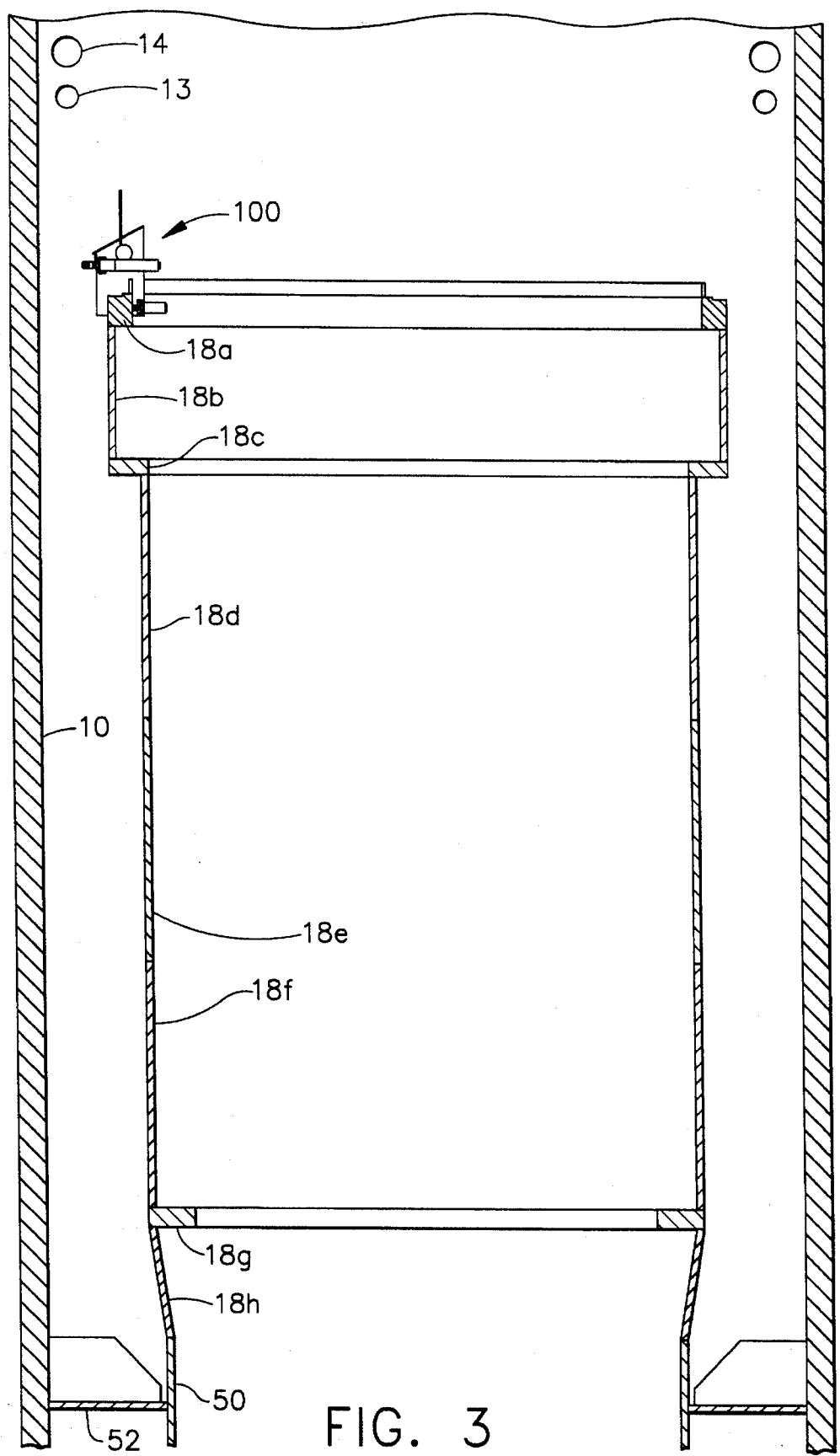
FIG. 3 is an elevational view of the downcomer annulus showing the positions of the feedwater sparger and core spray piping relative to the shroud in a conventional BWR.

Before the EDM actuator is lowered into the annulus, the tool 100 of the present invention is installed on the shroud flange, as shown in FIG. 3, to protect the shroud flange 18a and steam dam 29 against damage caused by impact of the EDM actuator as it descends and to guide the EDM actuator into the annulus. The tool also has a cable manipulator for correctly positioning the EDM actuator to precise locations in the annulus.

Figure 4:
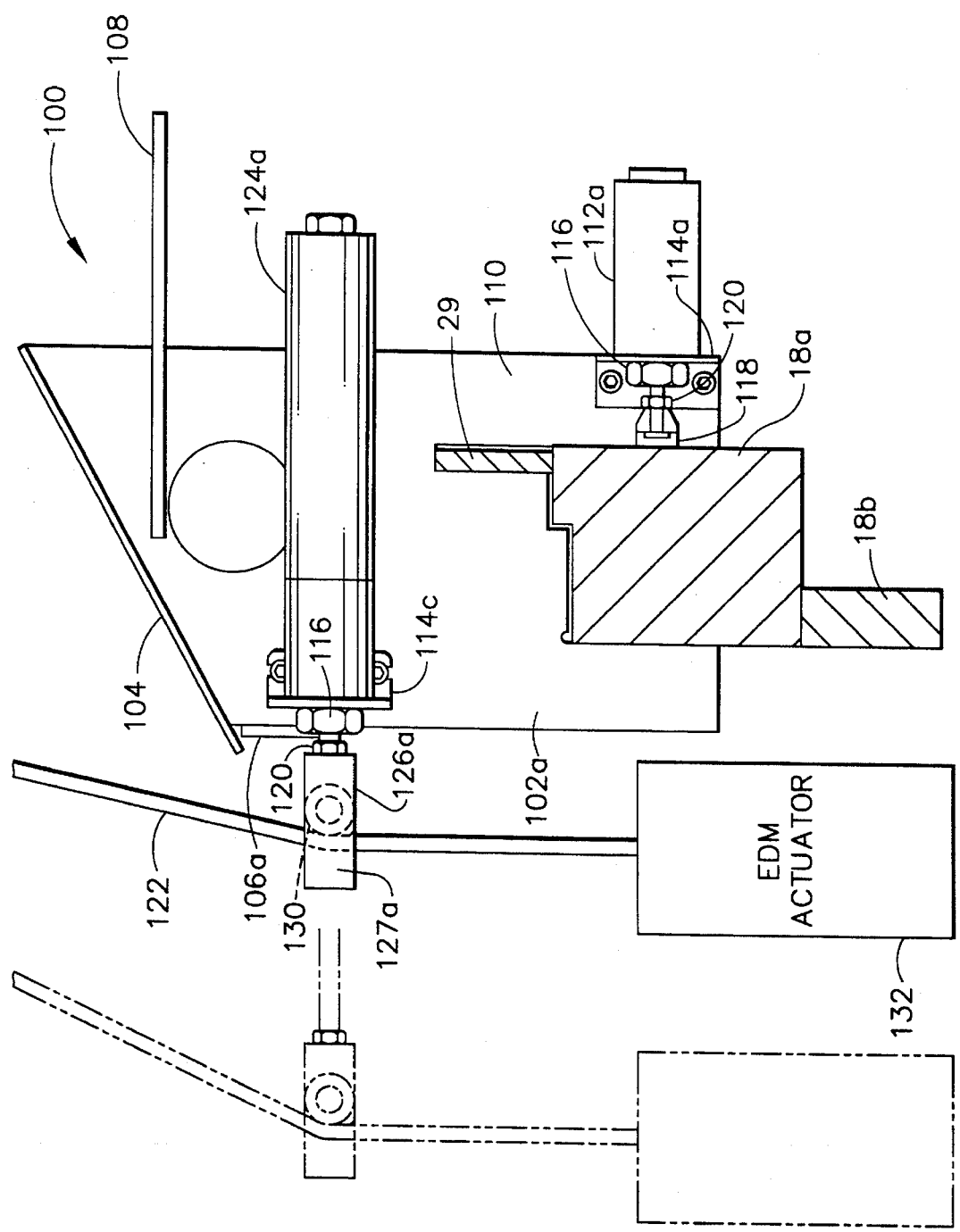
FIGS. 4, 5 and 6 are side elevational, rear elevational and plan views, respectively, of the tool in accordance with the preferred embodiment of the present invention.
Figure 5:
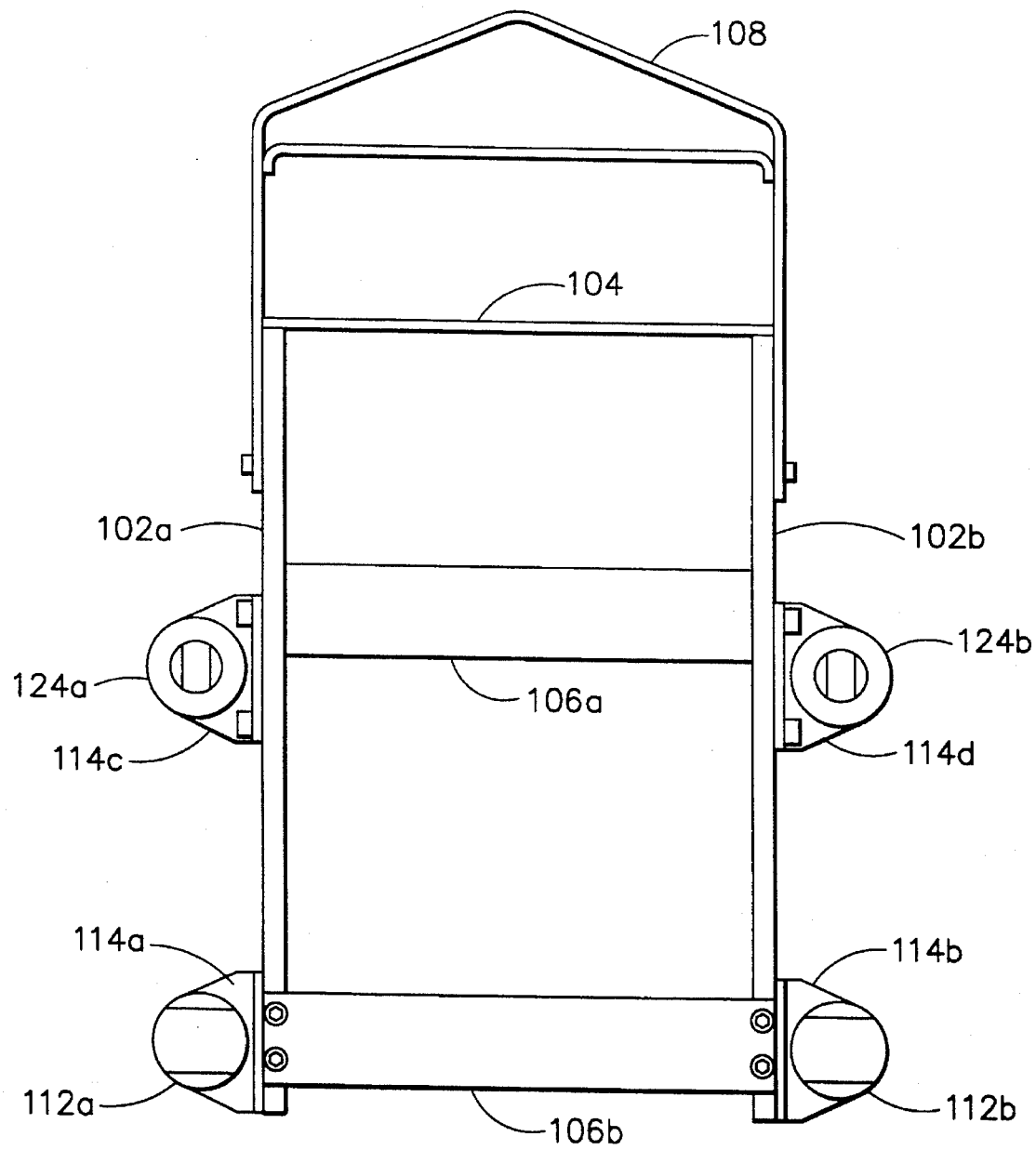
Figure 6:
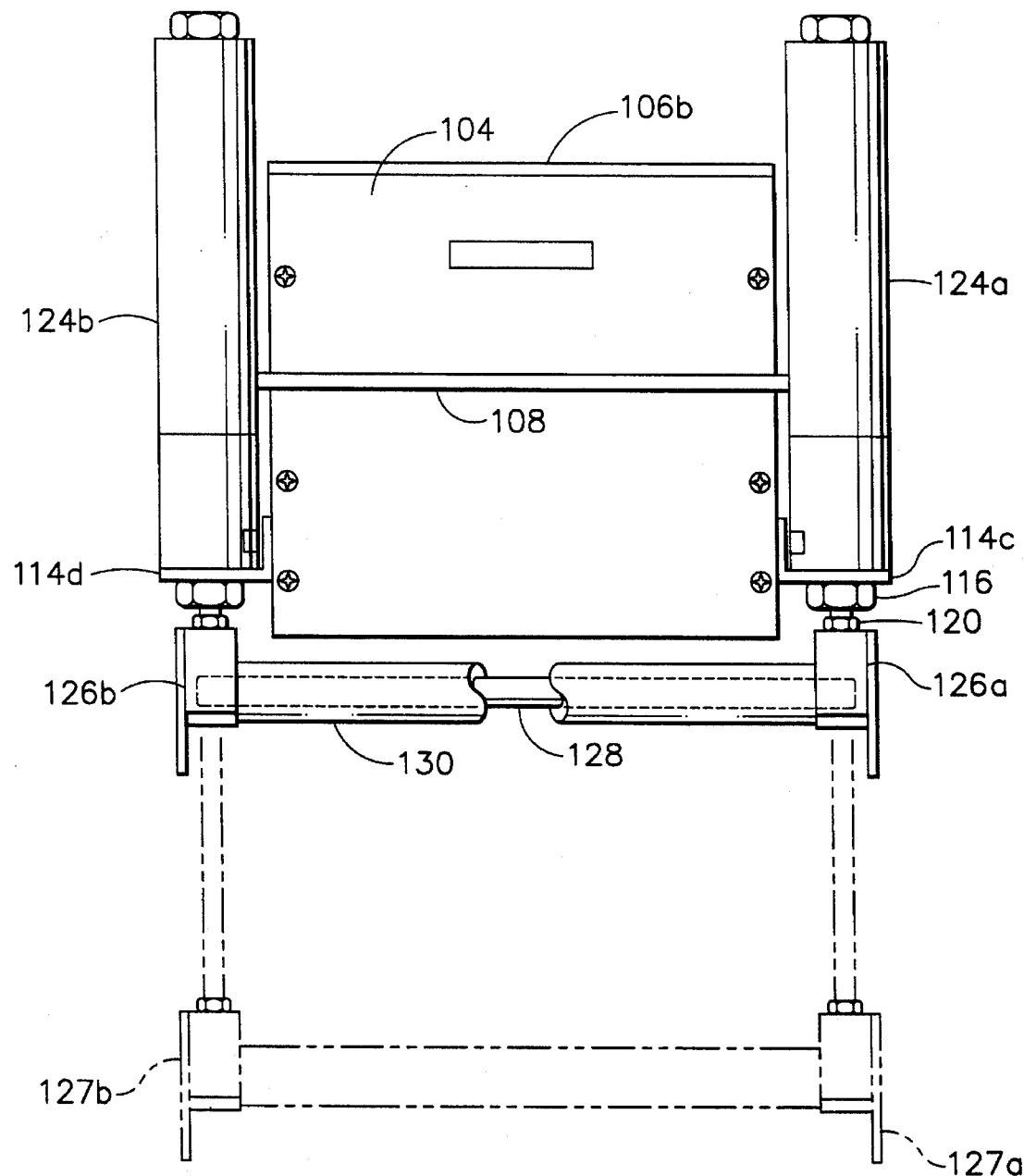

The structural details of tool assembly 100 are depicted in FIGS. 4–6. Referring to FIG. 4, tool 100 comprises a support frame consisting of a pair of generally parallel side plates 102a and 102b connected at the top edges to opposing sides of an inclined top plate 104, which serves as the slide. The side plates are maintained in rigid alignment by stiffener plates 106a and 106b at the front and back of the tool respectively, best seen in FIG. 5.

A bail 108 has a pair of arms which are pivotably mounted to side plates 102a and 102b respectively. The tool is installed on the shroud flange 18a at the azimuthal position of the gusset plate 58 by grappling the bail 108. While the tool is in place on the shroud flange, the bail can be rotated toward the shroud centerline and away from the annulus so that the bail does not interfere with the passage of hardware and tooling into the annulus. The tool is later removed by grappling the bail, returning the bail to the vertical position and then hoisting the tool.

Each side plate 102a and 102b has a recess which conforms to the shape of the top surface of shroud flange 18a and the shape of the steam dam 29. The portion 110 of each side plate hooks on the inner circumference of shroud dam 29. A pair of air-actuated or hydraulic clamping cylinders 112a and 112b are mounted on portions 110 of side plates 102a and 102b, respectively, by means of mounting brackets 114a and 114b. Each clamping cylinder is secured to the respective mounting bracket by a mounting nut 116. The piston of each clamping cylinder has a gripper 118 coupled thereto by a jam nut 120. When tool 100 is positioned correctly on the shroud flange, clamping cylinders 112a and 112b are actuated to extend their respective pistons in parallel in a horizontal direction. The extended pistons force the grippers 118a and 118b into abutment with the inner peripheral surface of the shroud flange. The resulting frictional forces hold the tool on the shroud flange.

As best seen in FIG. 4, any hardware or tooling lowered onto the inclined top plate 104 will slide down the incline and into the annulus. By deflecting the path of the descending hardware or tooling, the slide protects the steam dam 29 and the shroud flange 18a against damage which might otherwise result from repeated impact by hardware and tooling.

In addition to the steam dam slide, tool 100 also incorporates a cable manipulator for displacing the cable 122, and the EDM actuator 132 supported thereby, radially outward, as shown in FIG. 4. As best seen in FIG. 6, the cable manipulator comprises a pair of air-actuated or hydraulic positioning cylinders 124a and 124b mounted on side plates 102a and 102b, respectively, by means of mounting brackets 114c and 114d. Each positioning cylinder is secured to the respective mounting bracket by a mounting nut 116. The piston of each positioning cylinder has an end block (126a, 126b) coupled thereto by a jam nut 120. Each end block (126a, 126b) has an end plate (127a, 127b) welded to the outside surface to prevent the cable from sliding off the end of the roller 130. The end blocks support the ends of a stainless roller pin 128. Roller pin 128 in turn supports a coaxial roller 130 which is loosely sleeved thereon. The roller is preferably made of ultra-high molecular weight polyethylene to prevent scratching of hardware and tooling which bear against the roller during descent in the annulus.

When the EDM actuator has descended below the elevation of the roller 130, positioning cylinders 124a and 124b are actuated to extend their respective pistons in parallel in a horizontal direction. The translated roller 130 pushes the cable 122 radially outward, as shown in FIG. 4, until the hoisted load 132 hangs at a desired radial position in the annulus. As the hoisted load is lowered further under the influence of gravity during unwinding of the cable by the hoist, the roller 130 rotates about the roller pin 128 while its outer circumference maintains contact with the traveling cable. During this descent, the pistons of the positioning cylinders remain in an extended state, so that roller 130 maintains the desired radial position of the traveling cable and the load suspended thereon.

For the sake of convenience, the pneumatic (or hydraulic) lines which connect the clamping and positioning cylinders to a source of pressurized air (or pressurized water) via an air (or hydraulic) control station are not shown. Preferably, the positioning cylinders have a common pneumatic (or hydraulic) line to ensure that the positioning cylinders actuate in tandem.

The tool in accordance with the present invention is not limited in application to when an EDM actuator is being inserted into the annulus. On the contrary, the tool has application when any hardware or tooling suspended on a cable and destined to enter the annulus is being lowered over the shroud flange. In particular, the steam dam slide with cable manipulator can be used to guide the tie rod assembly into the annulus and then radially position the tie rod assembly in the annulus by displacing the cable radially outward during the shroud repair operation.

The preferred embodiment of the installation tool in accordance with the present invention has been disclosed for the purpose of illustration. Variations and modifications of the disclosed structure which fall within the concept of this invention will be readily apparent to persons skilled in the art of tooling design. All such variations and modifications are intended to be encompassed by the claims set forth hereinafter.

I claim:

1. A tool for radially positioning a cable having a load suspended therefrom in an annulus between a shroud and a reactor pressure vessel of a nuclear reactor, comprising:

a rigid support frame having first and second side plates, each side plate having a recess with a profile which matches the cross-sectional profile of an uppermost portion of the shroud;

first and second positioning cylinders mounted on said rigid support frame and having first and second pistons respectively which extend in parallel in a predetermined direction; and a roller rotatably mounted for rotation about an axis and coupled to said first and second pistons so that said roller translates in said predetermined direction during concurrent extension of said first and second pistons.

2. The tool as defined in claim 1, further comprising first and second end blocks attached to the distal ends of said first and second pistons respectively, and a roller pin having opposing ends respectively supported by said first and second end blocks, wherein said roller is rotatably mounted on said roller pin.

3. The tool as defined in claim 1, wherein said roller has a non-metallic surface.

4. The tool as defined in claim 1, wherein said positioning cylinders are arranged so that said predetermined direction is generally radially outward relative to the shroud when said tool is positioned so that the uppermost portion of the shroud is fitted in said recesses in said first and second side plates.

5. The tool as defined in claim 1, further comprising first and second clamping cylinders mounted on said rigid support frame and having third and fourth pistons respectively, said first and second clamping cylinders bearing against an inner surface of a shroud flange when said tool is positioned so that the uppermost portion of the shroud is fitted in said recesses in said first and second side plates.

6. The tool as defined in claim 5, further comprising first and second grippers mounted on the ends of said third and fourth pistons respectively.

7. The tool as defined in claim 1, further comprising a top plate connected to said first and second side plates, said top plate being oriented at an incline relative to a central axis of the shroud when said tool is positioned so that the uppermost portion of the shroud is fitted in said recesses in said first and second side plates, the elevation at points along said top plate decreasing in a radially outward direction.

8. A tool for positioning a load suspended on a cable in an annulus between inner and outer cylindrical structures which are generally concentric, comprising:

a rigid support frame having first and second side plates, each side plate having a recess with a profile which matches the cross-sectional profile of an uppermost portion of the inner cylindrical structure;

first and second positioning cylinders mounted on said rigid support frame and having first and second pistons respectively which extend in parallel in a predetermined direction; and a pusher member having opposing ends respectively coupled to said first and second pistons so that said pusher member translates in said predetermined direction during concurrent extension of said first and second pistons.

9. The tool as defined in claim 8, wherein said pusher member comprises a roller having an axis of rotation transverse to said predetermined direction.

10. The tool as defined in claim 9, wherein said roller has a nonmetallic surface.

11. The tool as defined in claim 8, wherein said positioning cylinders are arranged so that said predetermined direction is generally radially outward relative to a central axis of the cylindrical structure when said tool is positioned so that the uppermost portion of the inner cylindrical structure is fitted in said recesses in said first and second side plates.

12. The tool as defined in claim 8, further comprising first and second clamping cylinders mounted on said rigid support frame and having third and fourth pistons respectively, said first and second clamping cylinders bearing against an inner peripheral surface of the uppermost portion of the inner cylindrical structure when said tool is positioned so that the uppermost portion of the inner cylindrical structure is fitted in said recesses in said first and second side plates.

13. The tool as defined in claim 8, further comprising a top plate connected to said first and second side plates, said top plate being oriented at an incline relative to a central axis of the shroud when said tool is positioned so that said upper portion of said shroud is fitted in said recesses in said first and second side plates, the elevation at points along said top plate decreasing in a radially outward direction.

* * * * *